US008407949B2

(12) United States Patent
Kellner

(10) Patent No.: US 8,407,949 B2
(45) Date of Patent: Apr. 2, 2013

(54) SCREW-IN GROUND ANCHOR

(76) Inventor: Peter Kellner, Philippsthal (DE)

( * ) Notice: Subject to any disclaimer, the term of this patent is extended or adjusted under 35 U.S.C. 154(b) by 0 days.

(21) Appl. No.: 12/870,643

(22) Filed: Aug. 27, 2010

(65) Prior Publication Data

US 2010/0319272 A1 Dec. 23, 2010

Related U.S. Application Data

(63) Continuation of application No. PCT/EP2009/052091, filed on Feb. 20, 2009.

(30) Foreign Application Priority Data

Feb. 29, 2008 (DE) .................. 10 2008 011 869
May 8, 2008 (DE) .................. 10 2008 022 458
May 30, 2008 (DE) .................. 10 2008 026 215

(51) Int. Cl.
*E02D 5/74* (2006.01)
*E04B 1/38* (2006.01)
*E04C 5/00* (2006.01)
*A45F 3/44* (2006.01)
*F16M 13/00* (2006.01)

(52) U.S. Cl. ............ 52/157; 52/155; 52/166; 52/705; 248/156; 248/545

(58) Field of Classification Search ............ 52/155–158, 52/166, 705; 248/85, 87, 156, 545; 175/327, 175/424
See application file for complete search history.

(56) References Cited

U.S. PATENT DOCUMENTS

| 1,883,447 | A | | 10/1932 | Bash |
| 4,803,812 | A | | 2/1989 | Alexander, Sr. |
| 5,295,766 | A | | 3/1994 | Tiikkainen |
| 5,906,077 | A | | 5/1999 | Andiarena |
| 5,930,959 | A | * | 8/1999 | van Halteren ............ 52/157 |
| 6,058,662 | A | | 5/2000 | Perko |
| 7,007,910 | B1 | * | 3/2006 | Krinner et al. ............ 248/530 |
| 7,416,367 | B2 | * | 8/2008 | St. Onge et al. ............ 405/230 |
| 7,441,471 | B1 | * | 10/2008 | Davis ............ 73/862.393 |
| 7,635,240 | B2 | * | 12/2009 | Gantt, Jr. ............ 405/252.1 |
| 2004/0086342 | A1 | | 5/2004 | Milne |

FOREIGN PATENT DOCUMENTS

| DE | 29 19 173 A1 | | 11/1979 |
| DE | 931 4973 U1 | | 5/1994 |
| DE | 44 24 339 A1 | | 1/1996 |
| DE | 20000183 | * | 5/2000 |
| DE | 200 00 183 U1 | | 7/2000 |
| DE | 10214083 A1 | | 10/2003 |
| DE | 202007004564 | * | 3/2007 |
| DE | 10 2005 045 574 A1 | | 4/2007 |
| DE | 20 2007 004 564 U1 | | 10/2007 |
| DE | 198 36 370 C2 | | 2/2010 |

(Continued)

*Primary Examiner* — Andrew Triggs
(74) *Attorney, Agent, or Firm* — Muncy, Geissler, Olds & Lowe, PLLC

(57) ABSTRACT

A foundation driller for anchoring of components in soil is provided that includes an apparatus in which the foundation driller comprises a base body with at least one cylindrical area and at least one cutting blade that provides forward advancement, in which the base body comprises at least two cylindrical areas with different diameters, wherein the area nearer to the soil has a smaller diameter and the at least one cutting blade providing forward advancement is attached at the area nearer to the soil and has an even incline.

18 Claims, 16 Drawing Sheets

FOREIGN PATENT DOCUMENTS

| | | | |
|---|---|---|---|
| EP | 0 182 286 A2 | 11/1985 |
| EP | 182286 A2 * | 5/1986 |
| GB | 1098555 A | 1/1968 |
| GB | 2 360 809 A | 10/2001 |
| GB | 2 426 012 A | 11/2006 |
| WO | WO 91/13225 A1 | 9/1991 |
| WO | WO 01/77444 A1 | 10/2001 |
| WO | WO 2007/036263 A1 | 4/2007 |

* cited by examiner

SCREW-IN GROUND ANCHOR

This nonprovisional application is a continuation of International Application No. PCT/EP2009/052091, which was filed on Feb. 20, 2009, and which claims priority to: German Patent Application Nos. DE 10 2008 011 869.9, which was filed in Germany on Feb. 29, 2008; to DE 10 2008 022 458.8 which was filed in Germany on May 8, 2008; and to DE 10 2008 026 215.3 which was filed in Germany on May 30, 2008; and which are all herein incorporated by reference.

BACKGROUND OF THE INVENTION

1. Field of the Invention

The invention relates to a screw-in ground anchor for anchoring structural elements in the soil, having a base member with at least one cylindrical region and having at least one cutting blade that produces forward motion.

2. Description of the Background Art

Numerous embodiments of such screw-in ground anchors are known. A screw-in ground anchor described in DE 198 36 370 C2, which corresponds to U.S. Pat. No. 7,007,910, has, on its end facing the earth, a conical element to which is attached a screw-like thread. On the side serving to attach posts, the conical element transitions into a cylindrical element, so that wooden posts or cylindrical steel pipes or tubes can be attached to the ground anchor by insertion into the cylindrical portion of the same.

The conventional arrangements are provided with an element that produces forward motion, which has the form of a screw-like helix. These are beset by the disadvantage that this design loosens the ground when being screwed into it, so that there is only limited protection against loosening and unscrewing.

SUMMARY OF THE INVENTION

It is therefore an object of the invention to provide a screw-in ground anchor with which it is possible to achieve good protection against loosening and unscrewing.

The invention can be used to anchor a variety of structural elements in the soil. Examples of such structural elements are traffic signs, advertising panels, solar arrays, conservatories, transmission towers, and a multitude of other structural elements. The invention makes it possible to secure an anchoring device in the soil in a flexible way and without great technical effort.

In an embodiment, a base member can contain at least two cylindrical regions with different diameters, wherein the region that is closer to the ground has a smaller diameter, and the at least one cutting blade that produces forward motion is attached to the region that is closer to the ground and has a uniform pitch.

This achieves the result that the anchor is easy to screw into the ground without the soil being loosened, and the outer wall of the base member is pressed tightly against the ground.

A uniform, constant pitch of the cutting blades can be achieved by the means that they are produced by forging or casting.

An embodiment provides for the cutting blade that produces forward motion to be composed of a plurality of individual blades that are affixed at the circumference of the ground anchor. The individual blades may have different diameters and different pitches to permit adaptation to different soil compositions. Moreover, it is possible for the individual cutting blades to be arranged on a thread pitch or next to one another at a height. It is also possible to combine these attachment options.

In another embodiment, the at least one cutting blade that produces forward motion is affixed to a sleeve, which is detachably connected to the base member of the screw-in ground anchor. Adaptation to different soil conditions can be easily accomplished by this means.

In addition, it is possible for at least one supplementary cutting blade to be attached to the upper region of the base member, wherein the supplementary cutting blade has a larger outside diameter, but the same pitch, as the cutting blade attached to the region closer to the ground. Consequently, the supplementary cutting blade can absorb great horizontal forces as well as great vertical forces, thus permitting high loads on the structures. The supplementary cutting blade can be composed of a single piece or of separate segments. Preferably, the supplementary cutting blade is made of steel. However, it can also be made of plastic, for example of polypropylene.

In another embodiment, the base member of the screw-in ground anchor has a tube to which the cutting blades are attached. This embodiment makes screwing into the ground especially easy, since the material can remain in the interior of the tube in this process, so that only very little soil material need be displaced when the screw-in ground anchor is screwed in. It is also possible to apply sawtooth-like points to the bottom face in order to support the screwing-in process. The tube has at its bottom end a frustoconical section, so that some of the soil is displaced outward and a high radial contact pressure is achieved without it being necessary to displace all the material.

In another embodiment, an auxiliary rod, which is detachably attached at the outer end of the base member and projects out of the upper end of the base member, is arranged inside the tube. In this way, the torque required when the screw-in ground anchor is screwed in can be absorbed by this auxiliary rod and be transmitted to the region of the base member close to the ground. This makes it possible to considerably reduce the torque acting on the base member. In this way, base members with a smaller diameter and/or smaller wall thickness can be used, permitting substantial cost savings.

An embodiment provides for the base member to contain three cylindrical regions with different diameters, wherein a region closest to the ground has the smallest diameter and the at least one cutting blade that produces forward motion is affixed to the middle region. In this embodiment, a high radial pressure arises between the ground and the base member. Consequently, this embodiment ensures high loading with relatively easy screw-in installation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
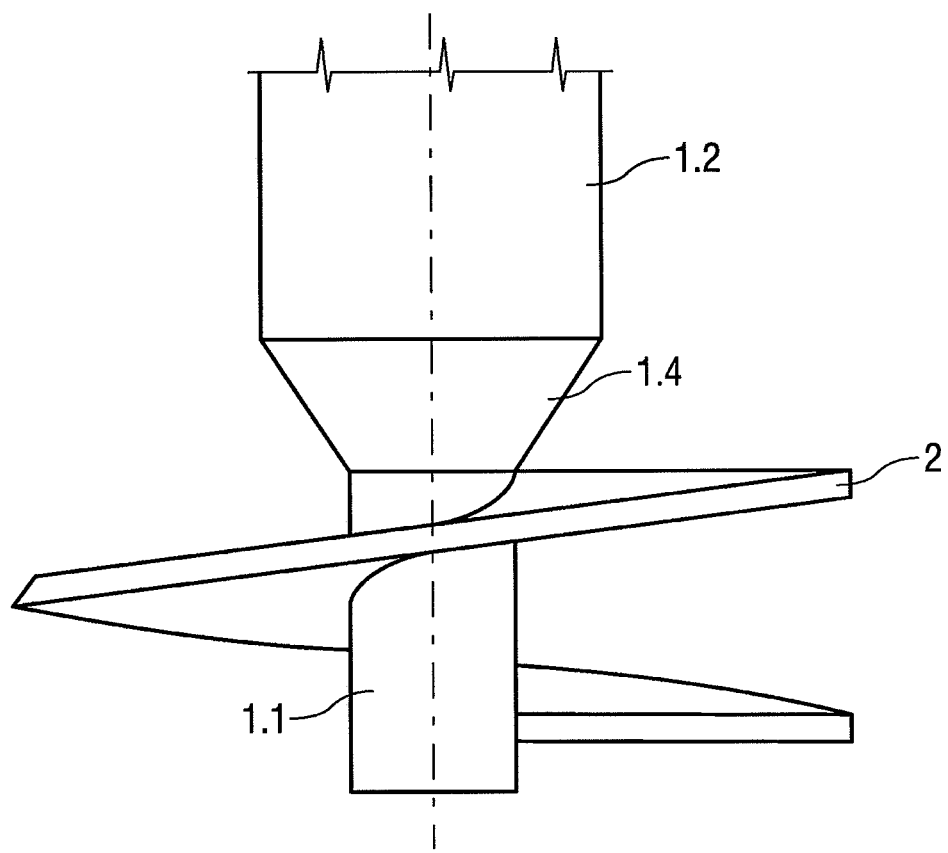
FIG. 1A illustrates a screw-in ground anchor, in which the cutting blades are affixed to a tube.

In the embodiment shown in FIG. 1A, the cutting blade 2 is welded to the lower cylindrical region 1.1 of the base member 1. In the case shown, the cutting blade 2 is designed in the form of a one-piece helix. However, it is also possible to attach the cutting blades as blade segments. The cutting blade 2 is manufactured as a forged or cast component, and is subsequently welded to the base member 1. It is ensured by this means that the pitch of the cutting blade 2 has a uniformly constant value, so that the ground is not loosened when the screw-in ground anchor is screwed in. The screwing-in process is facilitated by the different diameters of the cylindrical regions 1.1 and 1.2, while firm pressure of the upper region 1.2 against the soil is nevertheless ensured, since the soil is compressed with the aid of the conical section 1.4 located between the lower region 1.1 and the upper region 1.2. The base member 1 is designed in the form of a tube, and is open at the bottom end. For this reason, it can accommodate a portion of the soil in its interior. By means of the choice of the relationship between the two cylindrical regions 1.1 and 1.2, it is possible to achieve optimum adaptation of the protection against loosening and of the force required during screwing in for the application at hand.

Figure 1B:
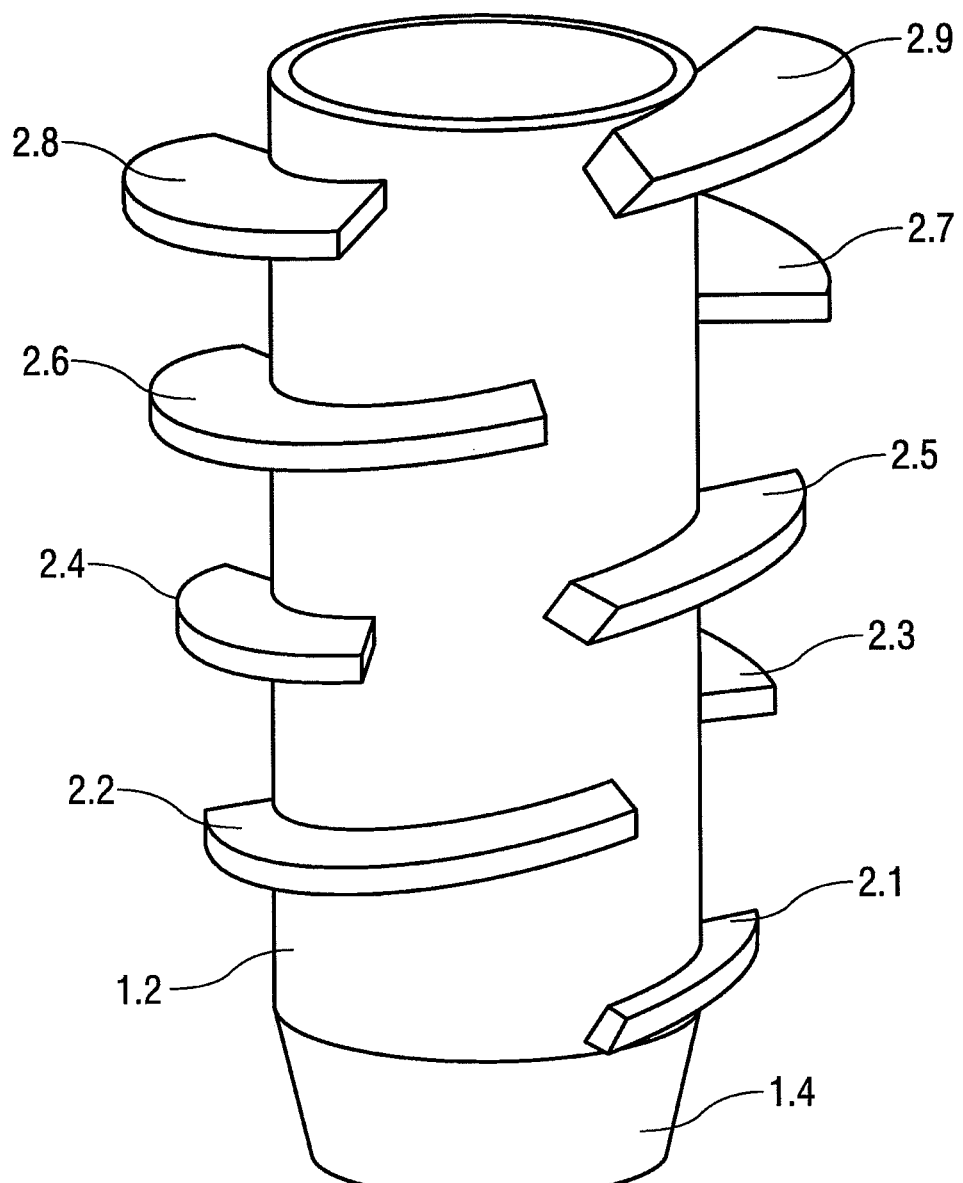
FIG. 1B illustrates a screw-in ground anchor, in which the cutting blades are affixed to a tube.

The variant shown in FIG. 1B explains an embodiment in which a plurality of cutting blades 2.1 through 2.9 are arranged on the base member 1, which is composed of a cylindrical tube part 1.2 with a conical region 1.4 located below it. This embodiment makes screwing into the ground especially easy, since material can remain in the interior of the tube in this process, so that only very little soil material need be displaced when the screw-in ground anchor is screwed in. The frustoconical section attached at the bottom end of the tube makes it possible to displace some of the soil outward and to achieve a higher radial contact pressure without it being necessary to displace all the material.

Figure 2A:
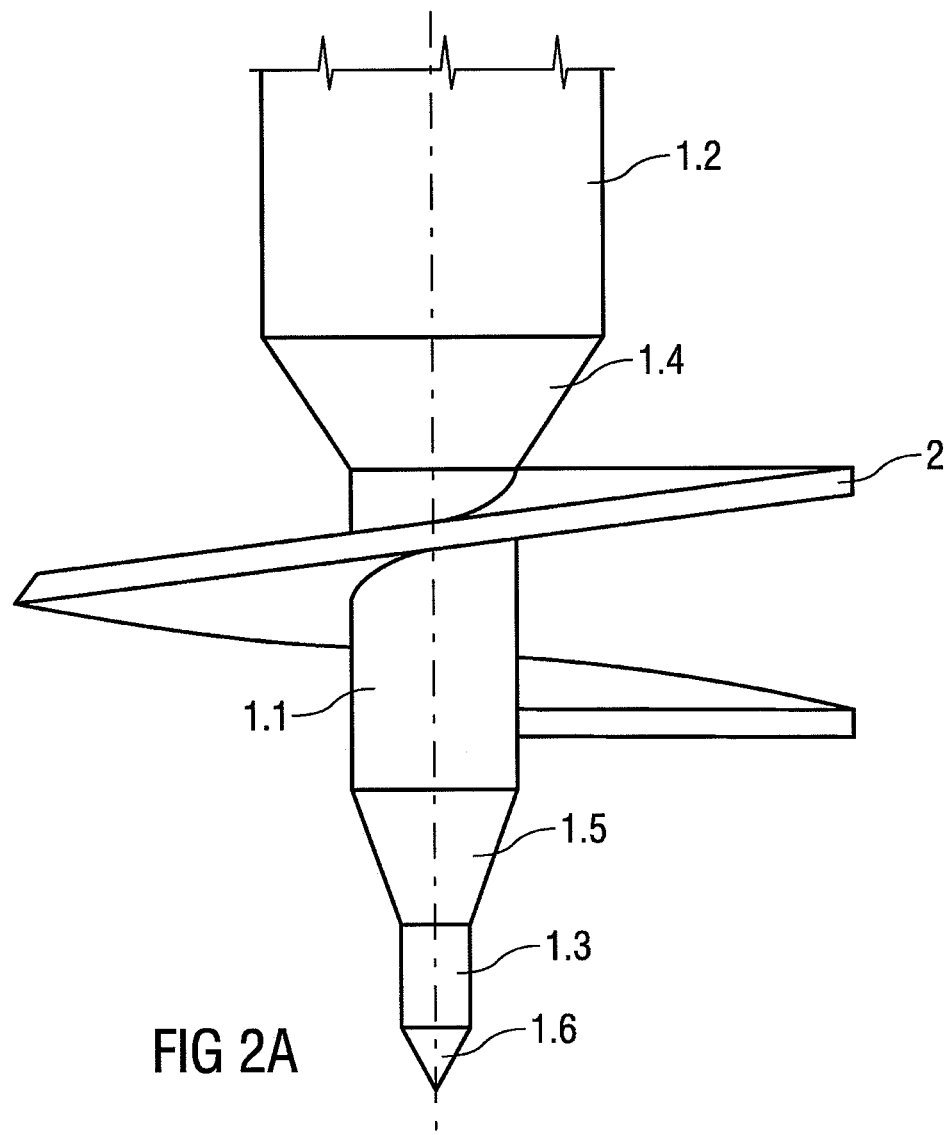
FIG. 2A illustrates an embodiment with a cutting blade attached to the middle cylindrical region.

In the embodiment shown in FIG. 2A, the base member 1 has a lower cylindrical region 1.3, a middle cylindrical region 1.1, and another cylindrical region 1.2 located above that. The lower cylindrical region 1.3 has the smallest diameter and the upper cylindrical region 1.2 has the largest diameter. Located between each of the three cylindrical regions 1.1 to 1.3 are conical regions 1.4 and 1.5. The cylindrical region 1.2 constitutes the shank of the screw-in ground anchor. This region is customarily implemented as a tube. A drilling tip 1.6 is attached to the ground-facing end of the lower cylindrical region 1.3.

An advantageous embodiment provides for means to increase friction to be located in the interior of the base member 1; during the screw-in process, these means are brought between the exterior surface of the base member 1 and the soil located around it, so that the friction is enhanced at these locations and the protection from inadvertent loosening is enhanced.

Figure 2B:
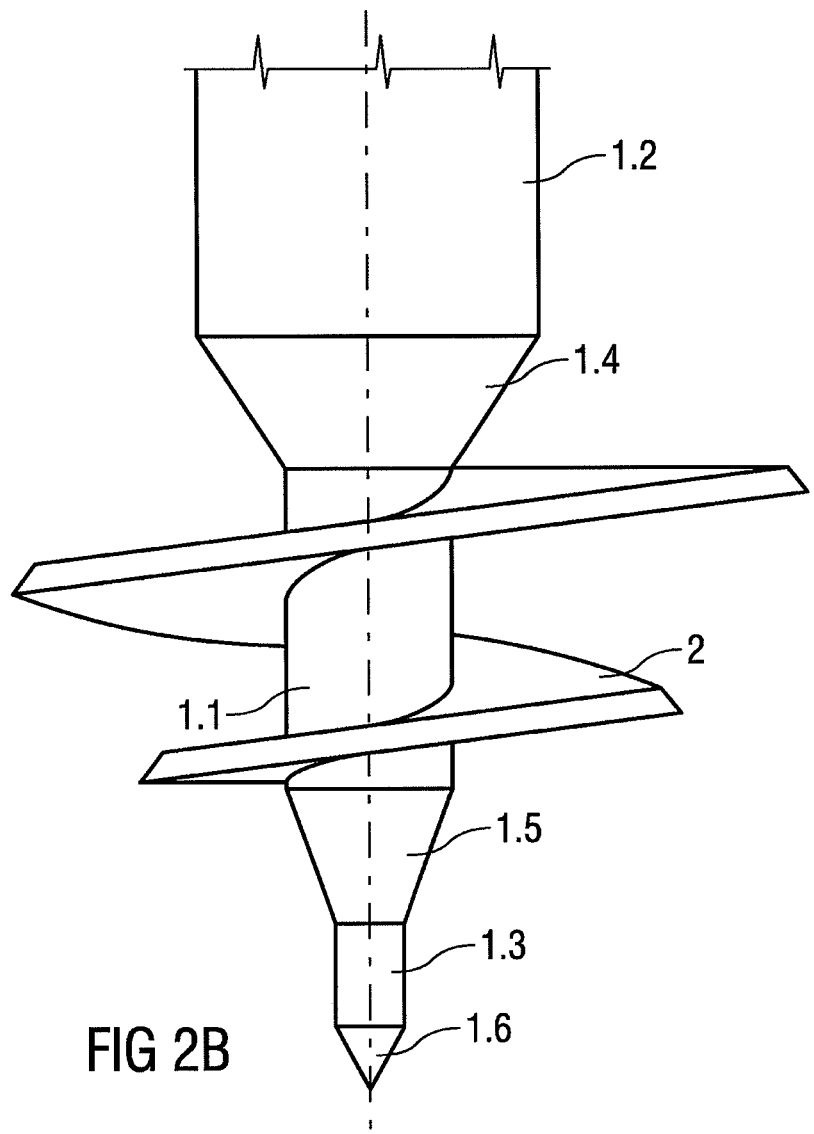
FIG. 2B illustrates an embodiment with a cutting blade of increasing diameter attached to the middle cylindrical region.

An advantageous embodiment of the cutting blade 2 is shown in FIG. 2B. Here, the helical cutting blade 2, which is attached to the middle cylindrical region 1.1, has a diameter that increases steadily upward. This embodiment makes penetration into the soil easier.

Figure 3A:
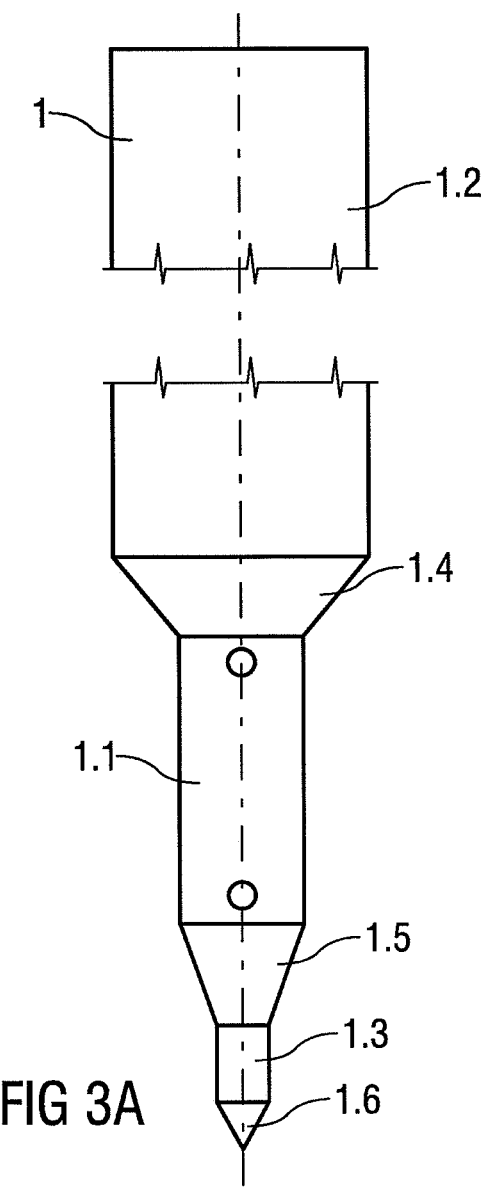
FIG. 3A illustrates a sleeve that is detachably affixed to the base member.
Figure 3B:
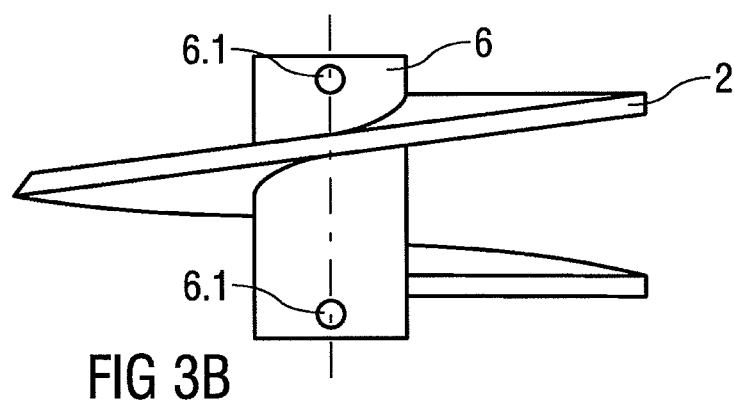
FIG. 3B illustrates a sleeve that is detachably affixed to the base member and to which the cutting blade is attached.

In the design shown in FIG. 3, a cutting blade 2 implemented as a screw-like helix is welded to a sleeve 2.1, which is detachably affixed to the base member 1. In this way, different cutting blades 2 can be attached to a screw-in ground anchor, so that the cutting blades can easily be adapted to the conditions at hand. The base member 1 used in FIG. 3A corresponds to the one shown in FIG. 2. FIG. 3B shows the sleeve 6. The sleeve 6 is attached to the cylindrical region 1.1 with the aid of mounting screws, which are passed through mounting holes 6.1 in the sleeve 6.

Figure 4:
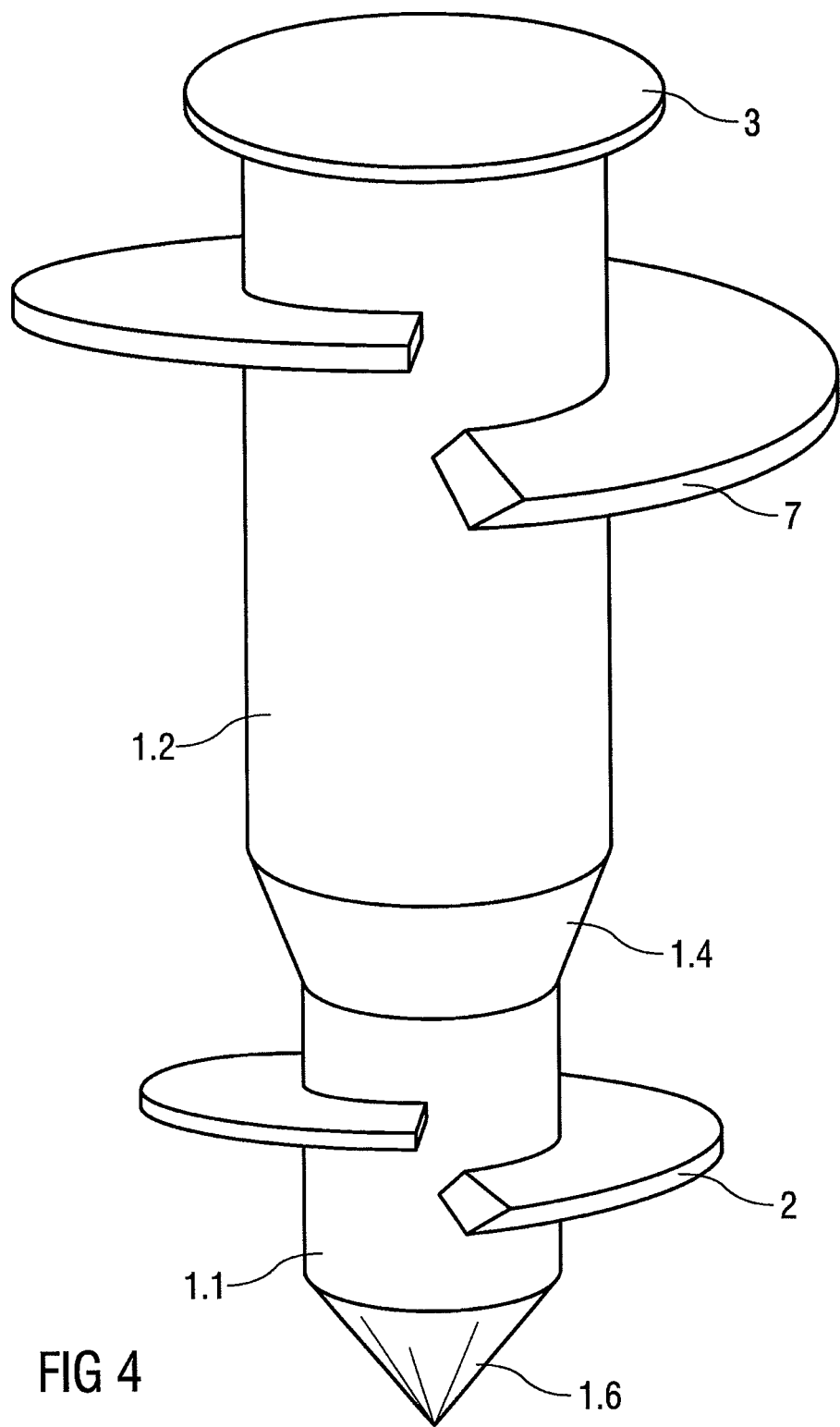
FIG. 4 illustrates a perspective view of an embodiment with supplementary cutting blade in the upper region of the base member.

Shown in FIG. 4 is an arrangement in which the base member 1 has a ground-facing cylindrical region 1.1 and, located above it, another cylindrical region 1.2 whose diameter is bigger than the diameter of the ground-facing cylindrical region 1.1. The cutting blade 2 is welded to the ground-facing cylindrical region 1.1. The cylindrical region 1.2 located above it constitutes the shank of the screw-in ground anchor. This region is customarily implemented as a tube. Located at the upper end of the base member 1 is the mounting part 3, to which the structures can be fastened. Somewhat below the mounting part 3, the supplementary cutting blade 7 is welded to the upper cylindrical part 1.2 of the base member. The supplementary cutting blade 7 is provided with a significantly larger outside diameter than the cutting blade 2 in order to ensure strong adherence of the screw-in ground anchor in the soil. The supplementary cutting blade 7 has the same pitch as the cutting blade 2 attached to the region closer to the ground. The supplementary cutting blade 7 can absorb great horizontal forces as well as great vertical forces, thus permitting high loads on the structures. A drilling tip 1.6 is attached to the bottom end of the lower region close to the ground 1.1. An advantageous embodiment makes provision for attaching the supplementary cutting blade 7 to a sleeve, which can be pushed onto the cylindrical region 1.2 and secured in a selectable position.

The base member 1 may be provided with a coating, either over its entirety or on its exterior surfaces. The coating may also be applied to the cutting blades 2. A powder coating is especially suitable for the coating.

Figure 5:
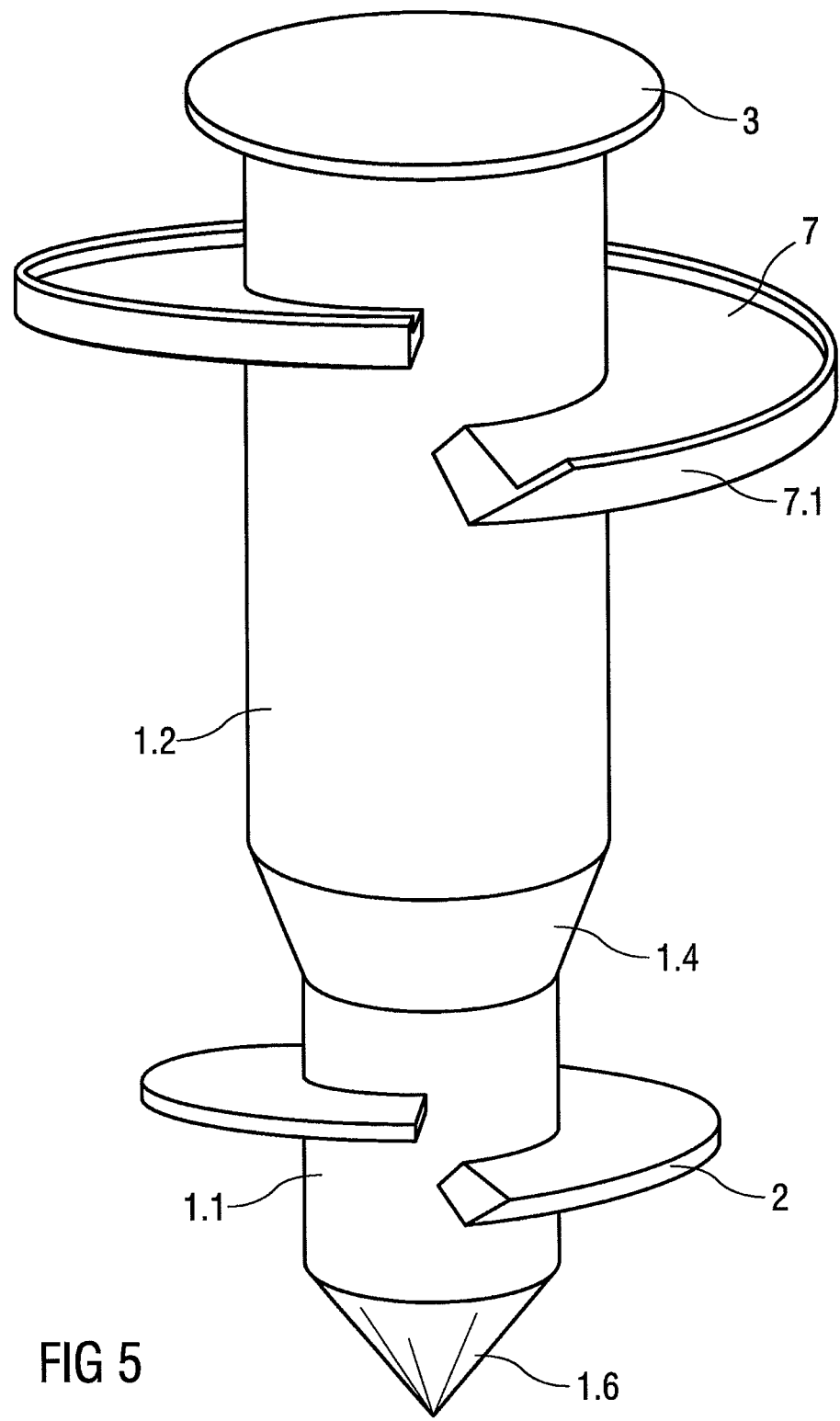
FIG. 5 illustrates an embodiment in which a vertical ring is attached to the supplementary cutting blade.

FIG. 5 shows an embodiment in which a vertical ring 7.1 is attached to the outside edge of the supplementary cutting blade 7; in the example shown here, the ring projects upward. It is also possible for the ring 7.1 to project downward, or even both upward and downward. Moreover, the ring 7.1 can also be made up of separate segments.

Figure 6:
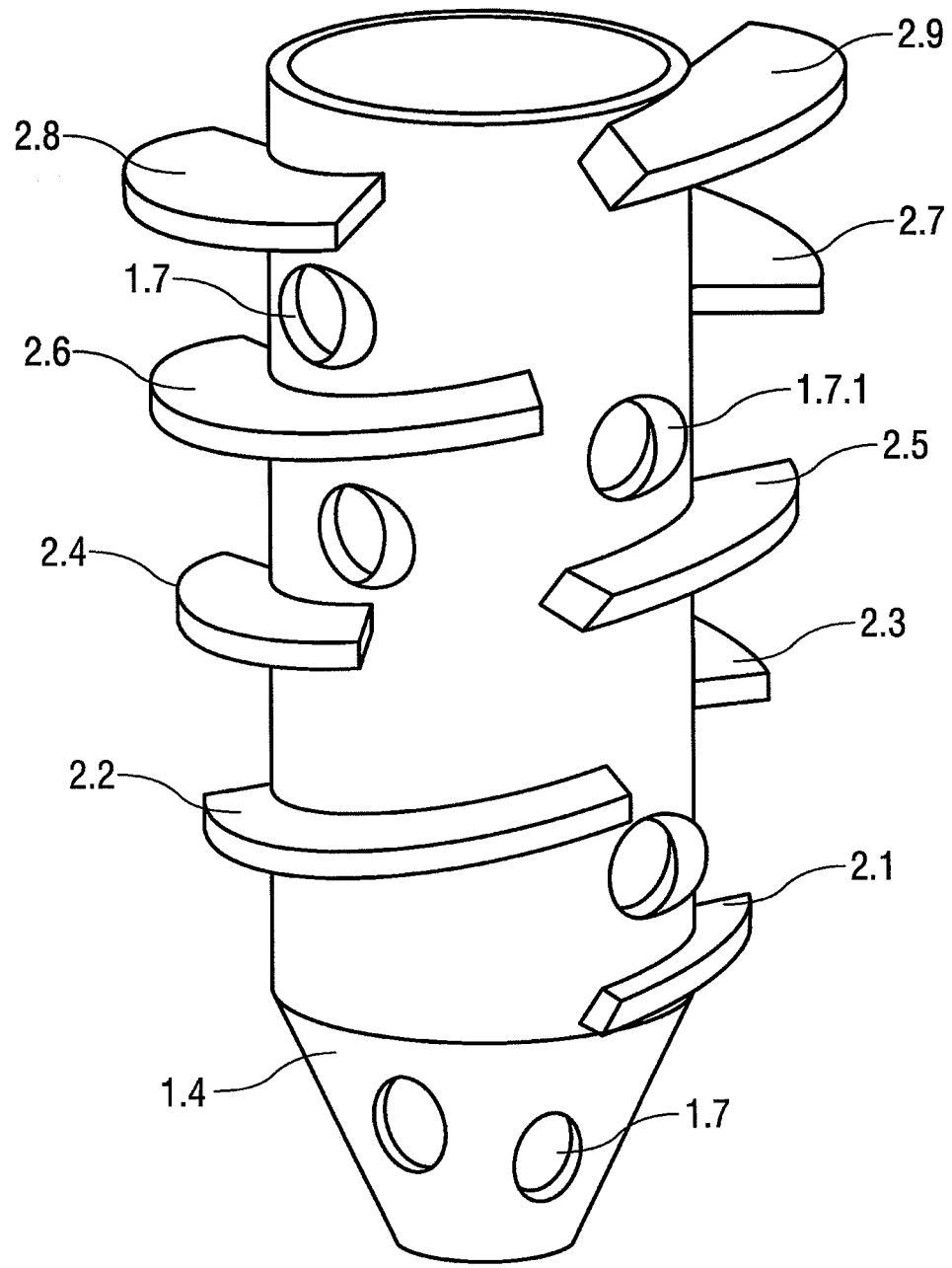
FIG. 6 illustrates a tubular screw-in ground anchor, which is conical in the bottom region.

Shown in FIG. 6 is a tubular screw-in ground anchor, which is conical in the lower region. The conical region 1.4 is provided with lateral openings 1.7, which make it possible to accommodate a portion of the displaced soil in the interior of the tube when the ground anchor is being screwed in. This produces, firstly, a displacement of the material from the center to the outside, resulting in radial pressure on the screw-in ground anchor, and hence firm seating of the screw-in ground anchor is ensured. Secondly, as a result of the number and size of the openings 1.7, a certain portion of the soil can be conveyed into the tube, so that all of the material does not have to be displaced, which would necessitate a high amount of force for the screw-in process. In this way, it is possible to optimize the balance between force to be applied and anchoring security. It is also possible for the lateral openings to be provided with protruding projections 1.7.1, in order to cut the material out of the ground and convey it into the interior of the tube. In addition, located in the base member are components for increasing friction, which are brought between the exterior surface of the screw-in ground anchor and the soil located around it during a screw-in process through one or more lateral openings.

Figure 7:
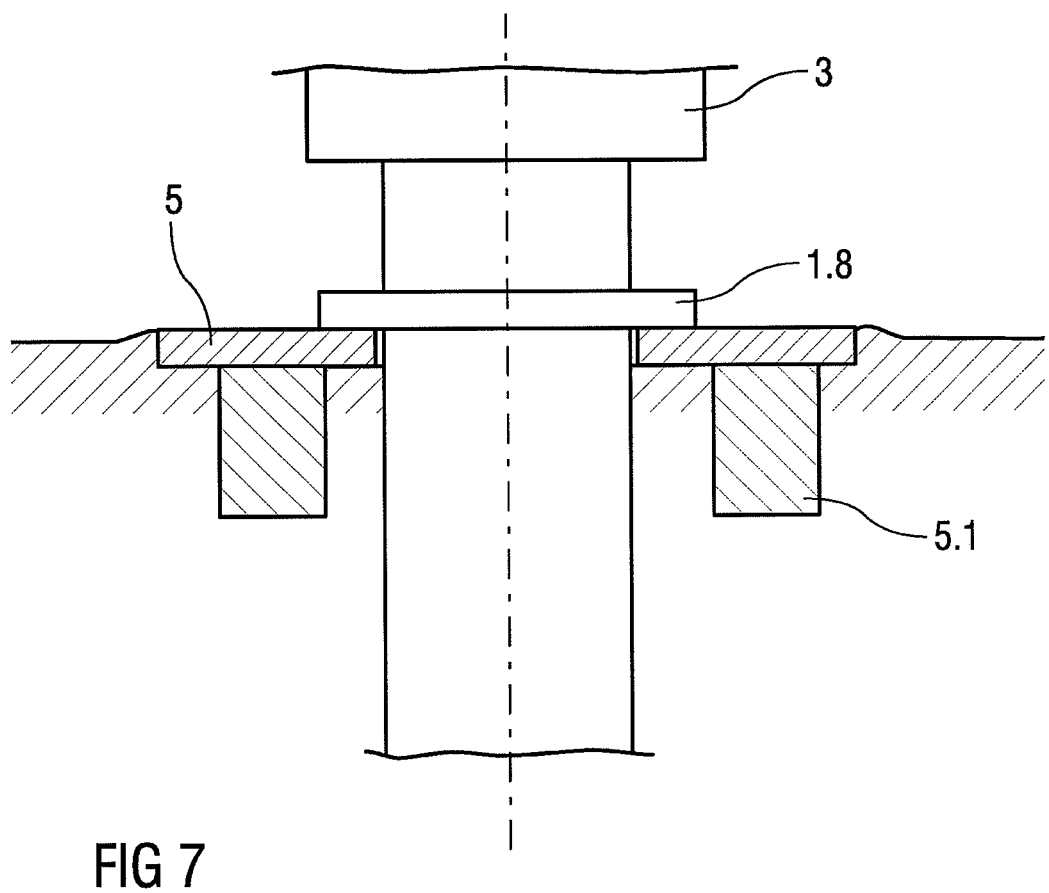
FIG. 7 illustrates an embodiment with a disk-shaped stabilizing element.

In FIG. 7, an embodiment is shown that achieves a substantial increase in protection against loosening of the screw-in ground anchor, which often is induced by shifting lateral loads. Welded to the top end of the base member 1, on the outside thereof, is a retaining ring 1.8. Located below the retaining ring 1.8 is a stabilizing element 5, which in the example shown is composed of a disk provided with a central hole. The diameter of this hole is somewhat larger than the outside diameter of the base member 1, so that the base member can be passed through the disk during the screw-in process. However, it is smaller than the outside diameter of the retaining ring 1.8, so that after the screw-in ground anchor has been screwed in the disk is pressed firmly against the ground and ensures that the ground anchor is well protected against loosening. On its underside the disk is provided with radially arranged vertical profiles 5.1, which anchor in the soil in an interlocking manner when the ground anchor is screwed in.

Figure 8:
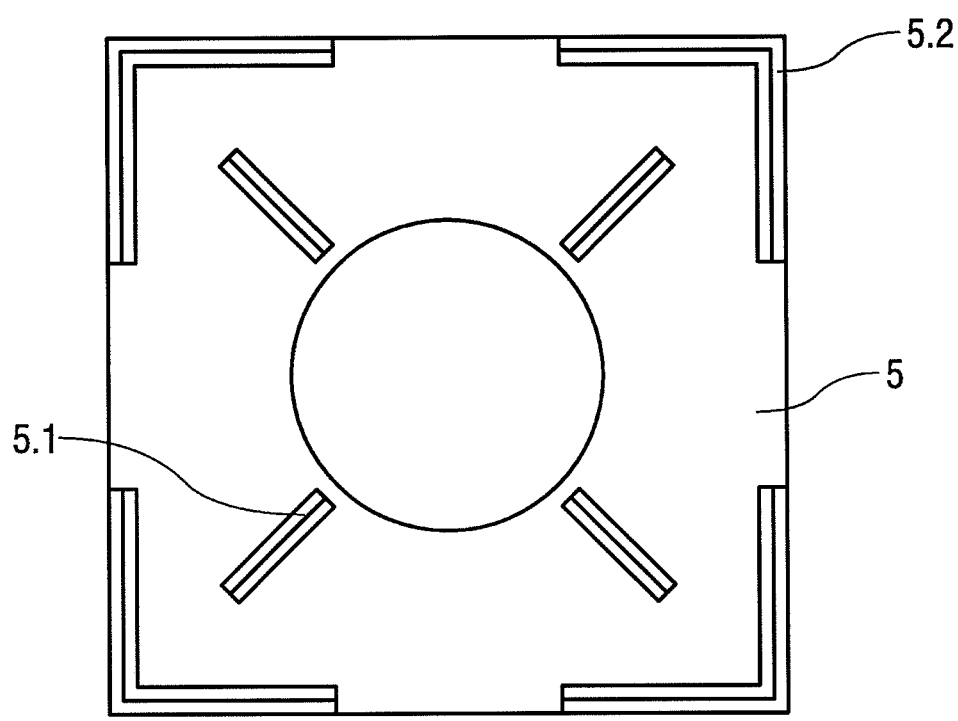
FIG. 8 illustrates an embodiment with a rectangular stabilizing element.

FIG. 8 shows another design possibility for the stabilization element 5. The form shown here includes a rectangular plate to whose underside are affixed four radial profile parts 5.1 and right-angled profile parts 5.2 at the corners. The radial profile parts 5.1 as well as the right-angled profile parts 5.2 may be provided on their undersides with a cutting edge in order to facilitate penetration into the ground.

Figure 9:
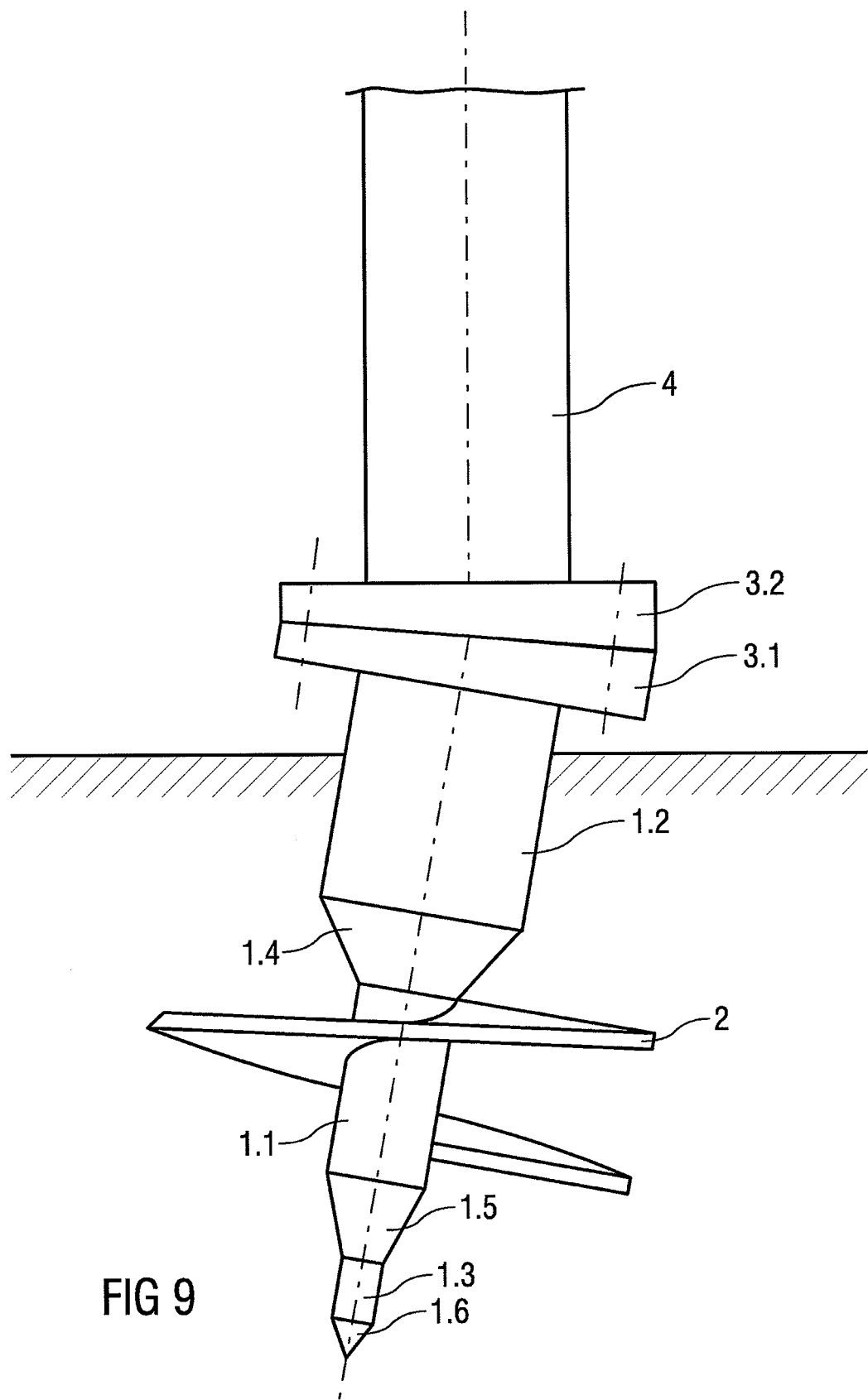
FIG. 9 illustrates a screw-in ground anchor with a tilt compensating device.

FIG. 9 shows an embodiment that makes it possible to compensate screw-in ground anchors that have been placed at an angle. When subsoils are inhomogeneous, it frequently occurs that the screw-in ground anchors run off-center when being screwed in, so that they stand at an angle in the ground. With the arrangement shown, a pole mounted thereon can be fastened such that it assumes a vertical position. To this end, a mounting device 3 is located between the upper region 1.3 of the screw-in ground anchor and the mounted part 4. The mounting device 3 has a lower connecting part 3.1 and an upper connecting part 3.2, which are implemented as rotating wedges. The rotating wedges here are rigidly attached as flanges to the upper region 1.3 of the screw-in ground anchor and to the structure 4. In this way the connecting parts 3.1 and 3.2 can be rotated relative to one another such that a vertical position of the mounted part 4 is achieved. After alignment, the connecting parts 3.1 and 3.2 are secured by means of screw connections.

Figure 10:
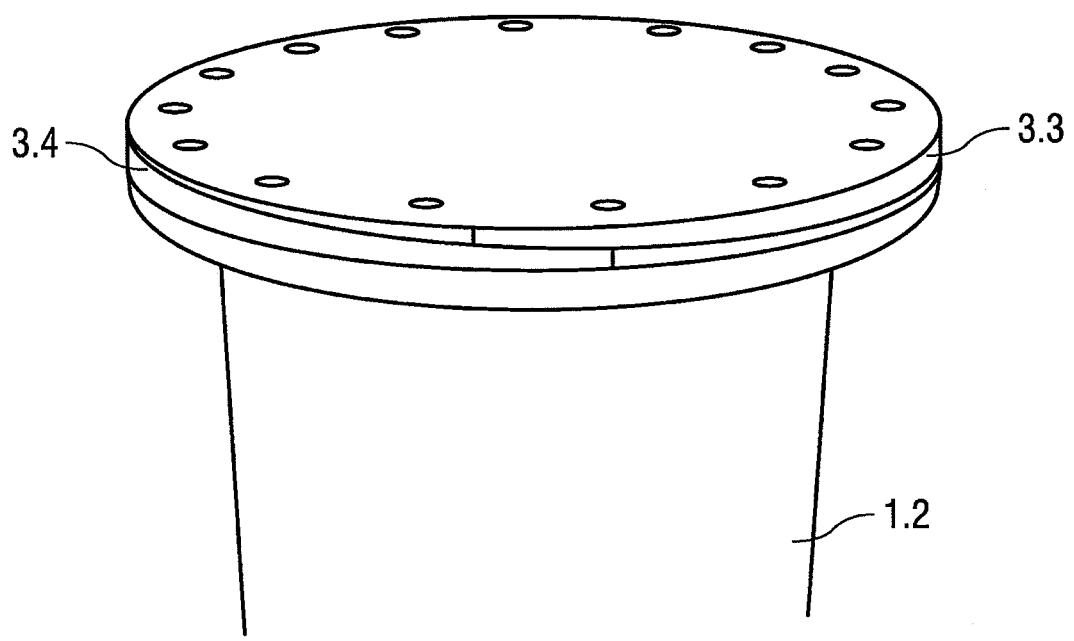
FIG. 10 illustrates a screw-in ground anchor with a tilt compensating device using rotating wedges.

Another possibility for compensation of screw-in ground anchors that have been placed at an angle is shown in FIG. 10. Here, rotating wedges 3.3 and 3.4 are arranged as separate intermediate parts. This arrangement makes it possible to align a mounted part in any desired rotational position about a vertical axis on a screw-in ground anchor that has been placed at an angle.

Figure 11:
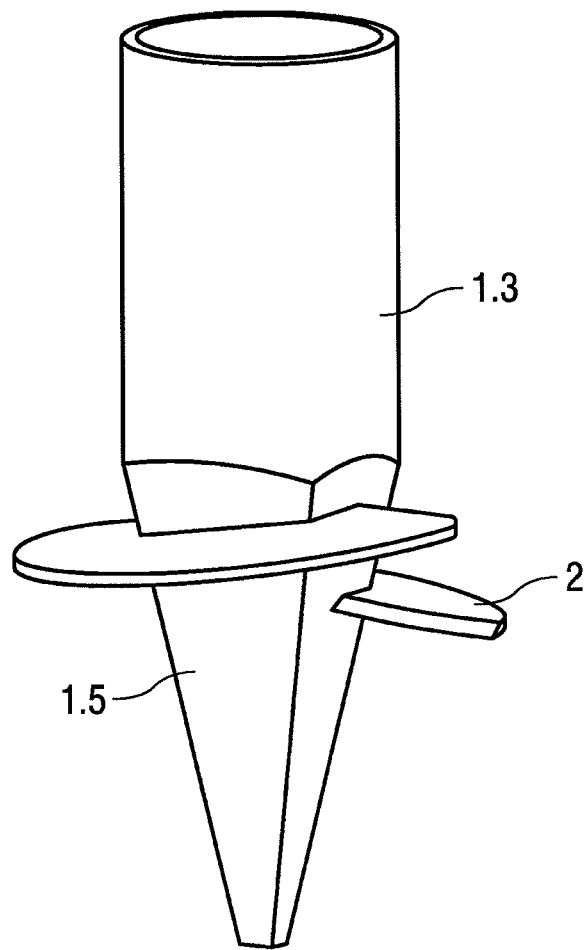
FIG. 11 illustrates a screw-in ground anchor with a pyramidal region close to the ground.

In the embodiment shown in FIG. 11, the ground-facing region of the screw-in ground anchor is designed with a pyramidal shape. In the example shown, the pyramidal region 1.5 has a square cross-section. However, other polygonal shapes are also possible.

Figure 12:
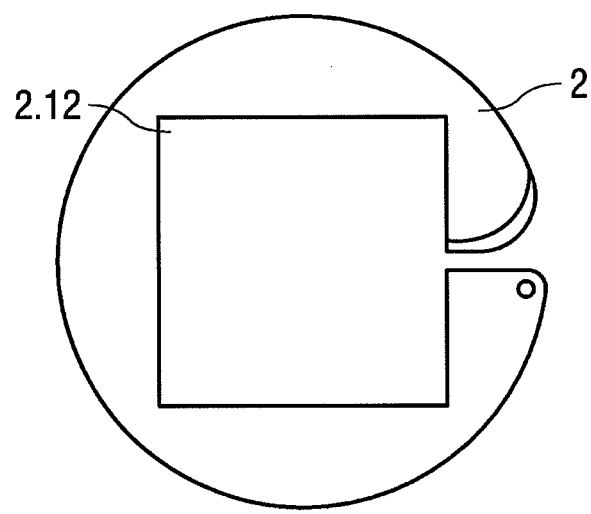
FIG. 12 illustrates a cutting blade with a polygonal cutout.

FIG. 12 shows a cutting blade 2 that is suitable for the embodiment explained in FIG. 11. The cutting blade 2 has a hole corresponding to the pyramidal region 1.5 of the base member. As a result, the cutting blade 2 and base member 1 are connected in a positive-locking manner, both in the direction of rotation and in the vertical joining direction, so that high forces can be transmitted reliably and simple installation is made possible.

Figure 13:
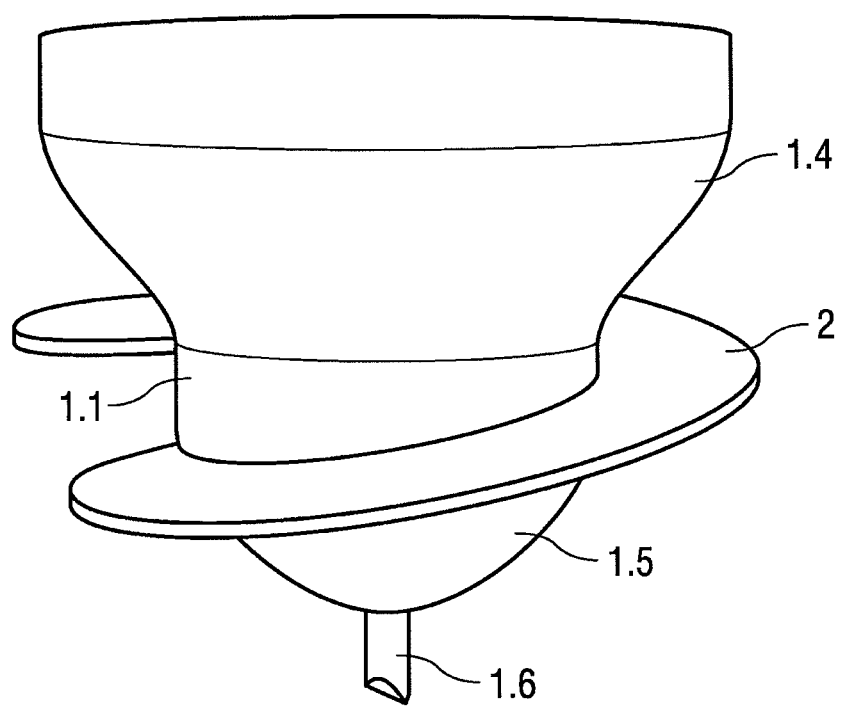
FIG. 13 illustrates a ground-facing end of the base member with conical regions.

FIG. 13 shows an embodiment of the ground-facing end of the base member 1 to which are attached two tapering regions 1.4 and 1.5.

Figure 14:
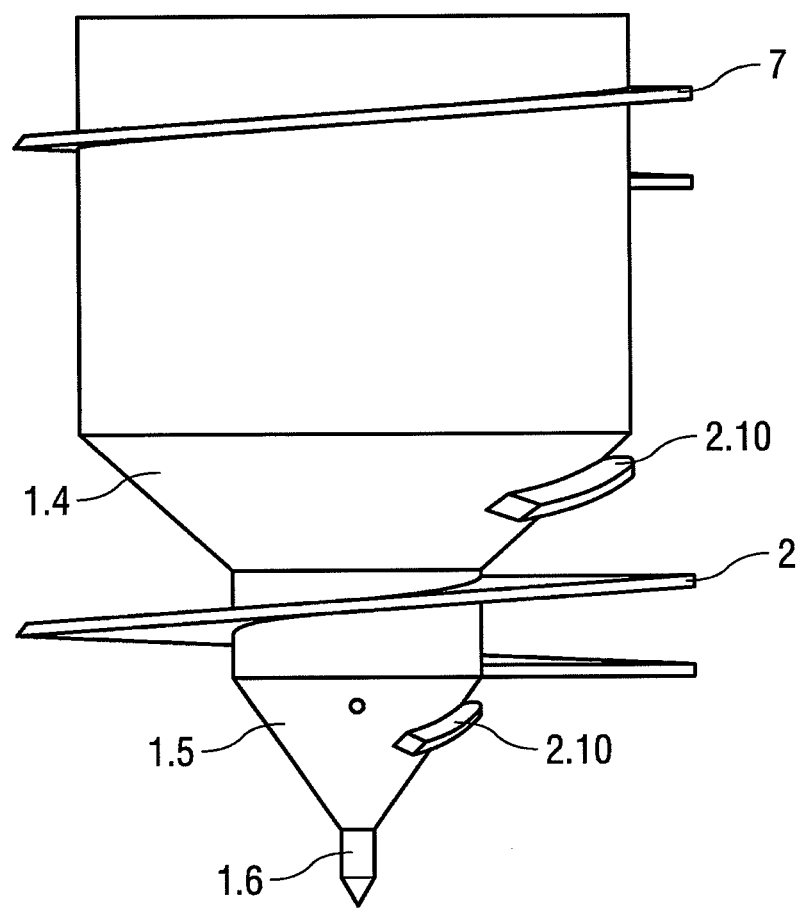
FIG. 14 illustrates an embodiment with additional cutting aids on the lower region of the base member.

In the embodiment shown in FIG. 14, additional auxiliary cutting blades 2.10, which facilitate the introduction of the base member located ahead of the cutting blades 2, are attached to the conical regions 1.4 and 1.5.

Figure 15:
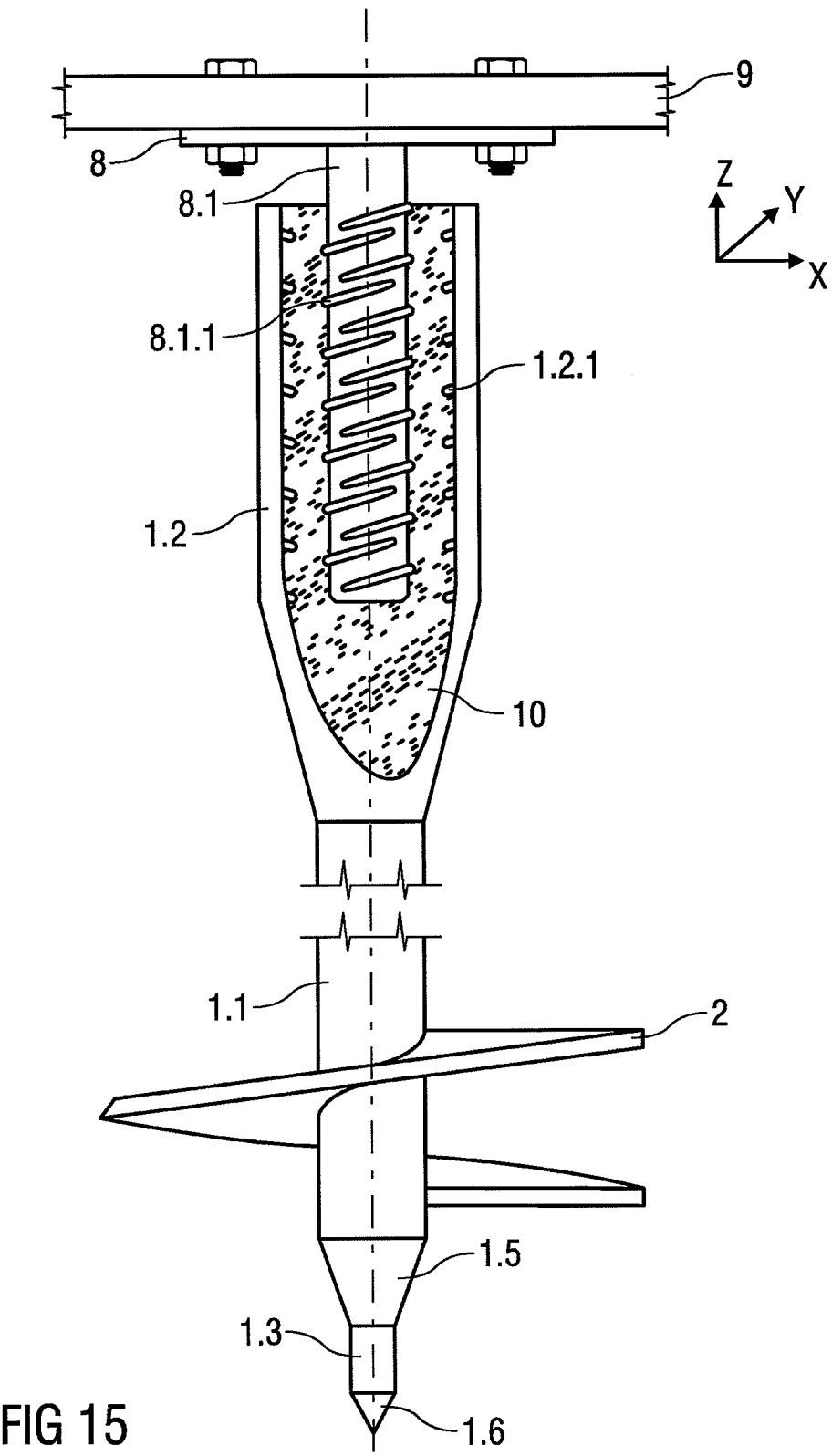
FIG. 15 illustrates an embodiment with adaptable connection.

Shown in FIG. 15 is an embodiment that permits the alignment of structures in multiple directions. To this end, a filling 10 of a curable material is introduced into the upper cylindrical region 1.2 of the base member 1. Concrete or synthetic resin may be used for this purpose, for example. The intended structure is inserted and aligned in this material prior to its curing. The alignment can be accomplished through displacement in the three linear directions x, y, and z, and also through tilting about any desired axes. In the example shown, a support 9 is provided, to which the intended structure is affixed. The support 9 is fastened to an intermediate support 8, on which is arranged a peg 8.1, which is placed in the curable material before it cures and is oriented there. To protect against inadvertent loosening, anchoring devices 8.1.1 are attached to the peg 8.1, and additional anchoring devices 1.2.1 are attached to the cylindrical region 1.2 of the base member 1. The upper cylindrical region 1.2 of the base member 1 is generally implemented with a larger diameter than the regions arranged below it. An advantageous embodiment provides for the upper cylindrical region 1.2 to be detachably connected to the region located below it, for example with a screw connection. In addition, it is possible that the intermediate support 8 is not fastened by embedding in a filling 10, but instead is secured by any desired mechanical connection.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A screw-in ground anchor for anchoring structural elements in soil, the screw-in ground anchor comprising:
    a base member including at least three regions having at least two cylindrical regions and at least one conical region wherein said at least three regions are arranged so that there are alternating cylindrical and conical regions with decreasing size in the direction towards the ground; and
    at least one cutting blade that produces forward motion,
    wherein each of the at least one cutting blade extends over only one of said cylindrical regions and does not extend over and does not extend beyond an extent of said one cylindrical region and does not extend over any region which has a conical shape,
    wherein the at least one cutting blade that produces forward motion is produced by forging or a casting process, is attached to the lower cylindrical region, and has a uniform pitch, and
    wherein a filling of a curable material is introduced into the upper cylindrical region of the base member, in which material a support is fastened directly or indirectly.

2. The screw-in ground anchor according to claim 1, wherein the at least one cutting blade that produces forward motion is affixed to a sleeve, which is detachably connected to the base member of the screw-in ground anchor.

3. The screw-in ground anchor according to claim 1, wherein at least one supplementary cutting blade is attached to the upper region of the base member, and wherein the supplementary cutting blade has a larger outside diameter but the same pitch as the cutting blade attached to the lower region that is closer to the ground.

4. The screw-in ground anchor according to claim 1, wherein the base member of the screw-in ground anchor has a tube to which the cutting blade and at least one supplementary cutting blade are attached.

5. The screw-in ground anchor according to claim 1, wherein the base member contains three cylindrical regions with different diameters, and wherein a region closest to the ground has the smallest diameter and the at least one cutting blade that produces forward motion is affixed to the middle region.

6. The screw-in ground anchor according to claim 1, wherein a drilling tip is attached to the ground-facing end of the base member.

7. The screw-in ground anchor according to claim 1, wherein the base member has tubular sections that have lateral openings.

8. The screw-in ground anchor according to claim 1, wherein the base member and/or the cutting blades is/are provided with a coating.

9. The screw-in ground anchor according to claim 1, wherein, located in the base member are components for increasing friction, which are brought between the exterior surface of the screw-in ground anchor and the soil located around it during a screw-in process through one or more lateral openings.

10. The screw-in ground anchor according to claim 1, wherein the ground-facing region is configured with a pyramidal shape, and the cutting blade has a hole corresponding to the pyramidal region of the base member.

11. The screw-in ground anchor according to claim 1, wherein one of the at least two cylindrical regions comprises an end of the screw-in ground anchor and includes an open bottom end.

12. The screw-in ground anchor according to claim 1, wherein the curable material comprises concrete or a synthetic resin.

13. A screw-in ground anchor for anchoring structural elements in soil, the screw-in ground anchor comprising:
    a base member having an open bottom end and including at least three regions having at least two cylindrical regions and at least one conical region wherein said at least three regions are arranged so that there are alternating cylindrical and conical regions with decreasing size in the direction towards the ground; and
    at least one cutting blade that produces forward motion,
    wherein each of the at least one cutting blade extends over only one of said cylindrical regions and does not extend beyond an extent of said one cylindrical region and does not extend over any region which has a conical shape,
    wherein the cutting blade that produces forward motion is composed of a plurality of individual cutting blades, which include segments that are arranged on a thread pitch or next to one another at a height, and
    wherein a filling of a curable material is introduced into the upper cylindrical region of the base member, in which material a support is fastened directly or indirectly.

14. The screw-in ground anchor according to claim 13, wherein one of the at least two cylindrical regions comprises an end of the screw-in ground anchor and includes the open bottom end.

15. The screw-in ground anchor according to claim 13, wherein the curable material comprises concrete or a synthetic resin.

16. A screw-in ground anchor for anchoring structural elements in soil, the screw-in ground anchor comprising:
    a base member having an open bottom end and including at least three regions having at least two cylindrical regions and at least one conical region wherein said at least three regions are arranged so that there are alternating cylindrical and conical regions with decreasing size in the direction towards the ground; and
    at least one cutting blade that produces forward motion,
    wherein each of the at least one cutting blade extends over only one of said cylindrical regions and does not extend beyond an extent of said one cylindrical region and does not extend over any region which has a conical shape, and
    wherein a filling of a curable material is introduced into the upper cylindrical region of the base member, in which material a support is fastened directly or indirectly.

17. The screw-in ground anchor according to claim 16, wherein one of the at least two cylindrical regions comprises an end of the screw-in ground anchor and includes the open bottom end.

18. The screw-in ground anchor according to claim 16, wherein the curable material comprises concrete or a synthetic resin.

* * * * *